Figure 4:
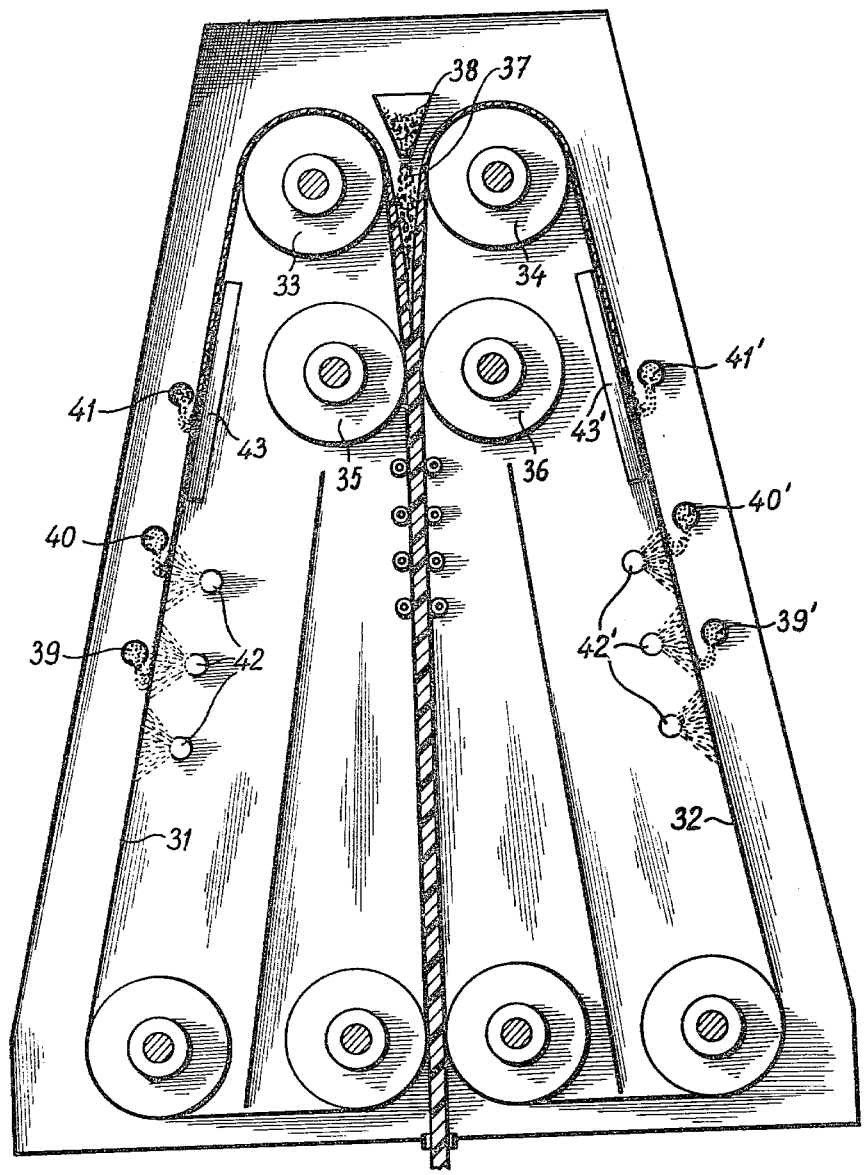

United States Patent [19]

Koster

[11] 4,311,657
[45] Jan. 19, 1982

[54] METHOD AND APPARATUS FOR FABRICATING SHEETS OF THERMOPLASTIC MATERIAL

[76] Inventor: Aloysius W. M. Koster, Kerkeindweg 10, 5582 HD Aalst/Waalre, Netherlands

[21] Appl. No.: 181,956

[22] Filed: Aug. 28, 1980

[30] Foreign Application Priority Data

Aug. 28, 1979 [NL] Netherlands .......................... 7906467

[51] Int. Cl.³ .............................................. B29D 7/14
[52] U.S. Cl. .................................. 264/171; 156/243; 156/244.18; 156/501; 156/549; 264/175; 264/212; 264/216; 264/255; 264/330; 425/224; 425/315; 425/371; 425/471
[58] Field of Search .............. 264/171, 175, 212, 216, 264/330, 255, 165–166; 425/224, 296–297, 298, 315, 371, 471, 329, 4 C, 817 C; 156/243, 244.18, 501, 549

[56] References Cited

U.S. PATENT DOCUMENTS

| | | | |
|---|---|---|---|
| 2,483,877 | 10/1949 | Carney | 264/216 |
| 2,515,243 | 7/1950 | Lyon | 264/175 |
| 2,532,280 | 12/1950 | Atkinson | 264/212 |
| 2,565,941 | 8/1951 | Barnard | 425/315 |
| 2,879,547 | 3/1959 | Morris | 264/171 |
| 3,032,815 | 5/1962 | Gerber | 264/171 |
| 3,257,484 | 6/1966 | Barnette | 264/261 |
| 3,872,197 | 3/1975 | Kato et al. | 264/175 |
| 4,004,870 | 1/1977 | Guttinger et al. | 425/371 |
| 4,128,369 | 12/1978 | Kemerer et al. | 425/371 |
| 4,184,824 | 1/1980 | Swasey et al. | 425/224 |

FOREIGN PATENT DOCUMENTS

1170195 1/1959 France .
69.19602 7/1970 Netherlands .
413345 12/1966 Switzerland .

OTHER PUBLICATIONS

"Sandvik Double Belt Cooler", *Chemical Engineering*, 12-1978, p. 46I.

*Primary Examiner*—Jeffery R. Thurlow
*Attorney, Agent, or Firm*—Young & Thompson

[57] ABSTRACT

The invention relates to a method and apparatus for fabricating sheets of thermoplastic or thermosetting material whereby said material in a non-hardened condition is fed into the space between the vertical parts of two endless belts which material according to the invention is supplied onto the returning parts of the belts in the form of webs or by spraying while preferably material is supplied as well from above within the gap between the layers facing each other.

8 Claims, 3 Drawing Figures

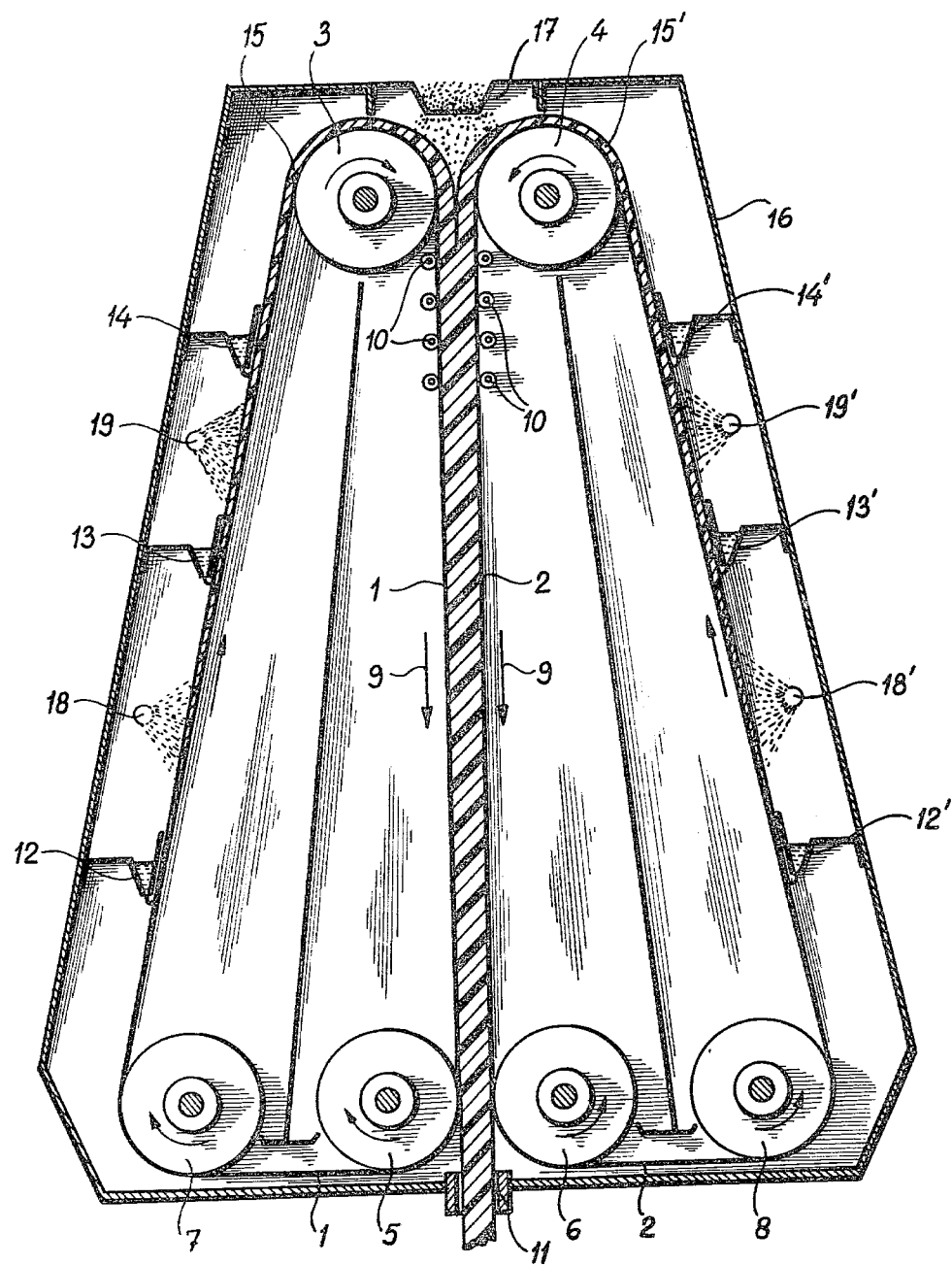

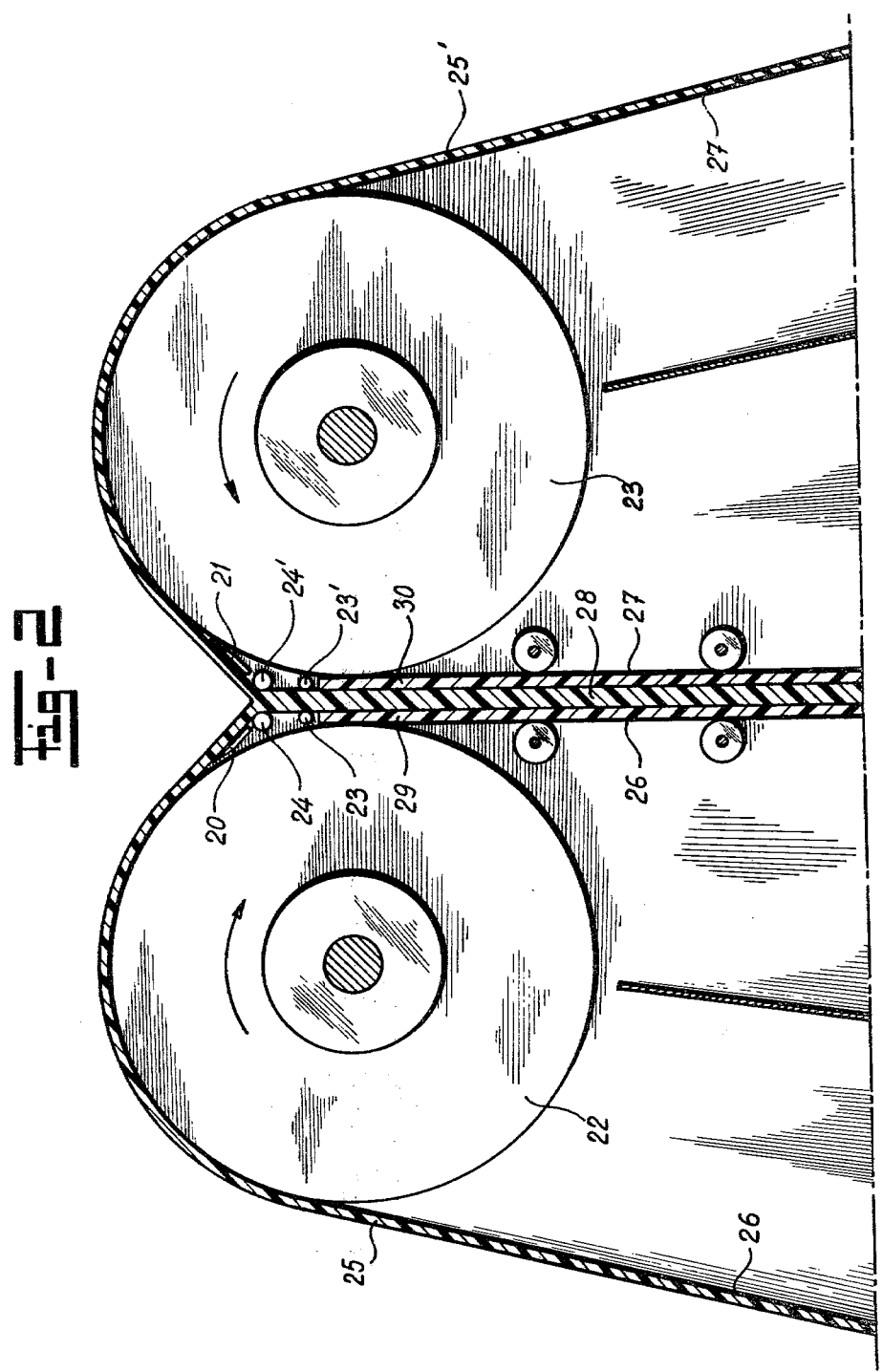

METHOD AND APPARATUS FOR FABRICATING SHEETS OF THERMOPLASTIC MATERIAL

The invention relates to a method for fabricating sheets of thermoplastic material, such as wax or a thermoplastic resin or sheets of thermosetting resin, whereby said material in a non-hardened condition is fed into the space between the vertical parts of two endless belts, said vertical parts of said belts running parallel to each other at a spaced distance.

Furthermore the invention relates to an apparatus for performing the method.

A similar method and similar apparatus are known. For instance Chemical Engineering, Dec. 18, 1978, page 46i, discloses an apparatus destined for wax, said apparatus being provided with belts arranged horizontally whereas an apparatus provided with belts arranged vertically is known from FIG. 14 of the Dutch Patent Application No. 69.19602 laid open to public inspection.

In this known method and apparatus the hardening of the thermoplastic material has to take place by heat transfer to the outside, i.e. through the endless belts. A period of some tens of minutes is required for cooling the face of the liquid layer or soft layer, respectively, contacting the belts. Many hours may however be required for cooling the core such being dependent on the thickness of the layer. As a consequence thereof the time for passing the layer through the apparatus is long and the productivity is low. The same problems occur also if use is made of a thermosetting material to which the heat has to be supplied.

The object of the invention is to overcome these difficulties.

This object is attained in accordance with the invention first of all in that the material is supplied on the returning parts. This supply may take place either by spraying or in the form of thin webs or curtains that are supplied at different locations as regards the level thereof and that will gradually form a layer moving upward together with the returning part.

With the aid of cooling means or heating means, respectively, the layer thus supplied on said returning part may be brought into a condition as favorable as possible for uniting, i.e. at the most favourable temperature so that the amount of heat yet to be removed from the layer after the cooling operation wil be small. Thereby it will be of great importance that the outer surface of the layers supplied on the returning part, i.e. supplied thereon successively, have already lost heat so that the layers at the location of the reversing wheels where they are brought into contact with each other, are contacted with each other at the cooled faces or precooled faces, respectively, so that the united layers between the parts of the endless belts, running parallel to each other will have a core that is pre-cooled already or anyway a core having a lower heat content than in the known method in which the still liquid core, said core consequently being at the highest temperature, will have to dissipate its heat through the outer layers that are in an already hardened condition whereby these layers exhibit an insulating effect.

It should also be noted that it is particularly useful to supply the material by spraying onto the parts running upward if one desires to avoid air pockets. In this way a homogeneous layer is obtained when using webs.

According to the invention it may moreover be advantageous to supply material also at the location of the upper reversing wheels. This supply may take place by feeding liquid material into the gap so that a thin layer at a higher temperature is supplied between the already pre-cooled outer surfaces of the layers that are moving towards each other and are present on each one of the belts. In this way there will be assured a good union of the two layers while forming a homogeneous entity with rapid dissipation of the heat to the already precooled surfaces.

In this connection it may however be of great importance that the temperature is controlled accurately during the feeding step, i.e. the supply on the outward parts of the belts running upwards.

In case of a thermoplastic material the material added at the location of the gap may also consist of already hardened material for instance in the shape of granules that are embedded between the layers.

In accordance with a preferred embodiment of the method and the apparatus, respectively, of the invention the additional material is supplied on the faces of the layers turned away from each other between these layers and at the belts. The surface resting against the belt is for that matter pre-cooled too so that if material is now supplied again between said pre-cooled surfaces and the belt it will be possible to increase the total thickness of the layer by a layer from which its heat may dissipate in a sufficiently high rate. Such may be realized by a construction in which there is provided a scraper at each one of the upper reversing wheels at a location situated above a horizontal plane through the axes of rotation of said wheels, respectively, said scraper being operative to lift the layer from the wheel, while below each one of said scrapers there is provided a supply tube for supplying liquid material.

In those cases in which the liquid material is supplied within the gap between the parts moving towards each other it may be preferred that the upper reversing wheels are spaced apart at a distance exceeding twice the thickness of a belt and a layer present on said belt while below said upper reversing wheels there are provided guide wheels for keeping the layers pressed against each other including the liquid layer enclosed there between.

The invention will now be elucidated in detail with reference to the drawings, in which FIG. 1 diagrammatically shows a cross section of an embodiment of the apparatus according to the invention;

FIG. 2 shows in a similar manner a variation of the apparatus according to FIG. 1; and FIG. 3 shows a third embodiment represented in a similar way.

With reference to FIG. 1 there is shown a apparatus having two endless belts 1 and 2 running over upper reversing wheels 3 and 4, lower reversing wheels 5 and 6 arranged vertically below said upper reversing wheels, as well as over lower reversing wheels 7 and 8 arranged next to said other lower reversing wheels. In the vertical part these belts move downward in the direction of the arrows 9 and for that matter at the same speed.

Due to the lateral displacement of the reversing wheels 7 and 8 with respect to the lower wheels 5 and 6 the returning part runs obliquely upwards.

As will be apparent from the drawings the two vertical parts are present at a constant distance with respect to each other, i.e. a substantially constant distance because the supporting wheels or rolls 10 shown in the top portion may be displaced somewhat towards each other so that they may accommodate the contraction of the intermediate layer due to the cooling thereof.

The thermoplastic material which leaves the apparatus at the lower end at 11 is fabricated and supplied in accordance with the invention at the location of the parts running obliquely upwards, which supply may take place in several ways.

In accordance with one possible way, diagrammatically represented by the trough structures 12, 13 and 14 and 12', 13' and 14', respectively this supply takes place through a slit in the bottom of these structures through which a thin web flows directly onto the belt and is carried upwards with said belt.

FIG. 1 shows three supply devices for each belt so that three layers are supplied successively. From the lowermost layer heat will be given off to the belt and to the surroundings, whereupon said lowermost layer is coated with a web from the supply device 13 forming a layer from which heat is given off to the layer already cooled somewhat and to the surroundings which process repeats itself at the device 14 so that a layer 15 or 15', respectively, is then formed which layer runs over the reversing wheels 3 and 4 whereupon the layers will meet each other. Between the wheels 3 and 4 and the vertical parts of the belts the still soft layers will be united. The entire apparatus is enclosed by a housing 16 to which cooling air or other media may be fed for controlling the temperature.

At 17 a supply device is shown by means of which already hardened granular material may be supplied, said material being enclosed between the layers 15 and 15'.

Instead of by means of the shown supply devices 12 to 14', inclusive, it is also possible to supply the liquid material by means of spraying devices 18 and 19 and 18' and 19', respectively, onto the belts 1 and 2.

With reference to FIG. 2 there is shown an embodiment including scrapers 20 and 21 mounted at a level situated above the axes of rotation of the reversing wheels 22 and 23, respectively. These scrapers guide the layers 25, 25' from the wheels 22, 23 towards each other and over guide rolls 24, 24'.

Below these rolls there are provided supply tubes 23, 23' from which for instance through a slit running in a longitudinal direction liquid material flows down into the space formed between the belts 26, 27 and the united layers 25, 25', the latter being indicated in this instance by the reference numeral 28. The layers 29, 30 thus added adhere to the composite layer 28 while giving off heat to said composite layer as well as to the belts 26 and 27, respectively.

With reference to FIG. 3 there is shown an embodiment having endless belts 31 and 32, respectively, which belts take substantially the same course as shown in FIG. 1. The difference resides in that the upper reversing wheels 33, 34 are spaced apart at a larger distance with respect to each other and that at a lower level there are provided guide wheels 35, 36, which guide wheels are spaced apart at a smaller distance than the wheels 33, 34, so that the ultimate thickness of the layer is set by said guide wheels. Between the wheels 33, 34 on the one hand and the wheels 35, 36 on the other hand the belts and consequently also the layers present thereon run towards each other in a V-shaped course so that within this space indicated by the reference numeral 37 liquid material may now be supplied again from the device 38.

FIG. 3 also shows some other constructional variations which are also applicable in the embodiment shown in FIGS. 1 and 2.

At the outside of the upward running parts of the belts 31, 32 there are provided supply devices 39, 40, 41 and 39', 40' and 41', respectively, from which a curtain of liquid material descends, said liquid material landing on the belts 31 and 32, respectively, to be entrained by said belts.

Furthermore spraying devices 42, 42' are arranged at the innerside of the belts from which spraying devices for instance a cooling medium or another medium at a certain desired temperature, respectively, may be sprayed against the back side of the belts.

At 43 and 43', respectively there are shown heat exchangers contacting the inner side of the belts and being operative to impart the desired temperature to said belts.

I claim:
1. A method of manufacturing sheets of thermoplastic material, comprising disposing a pair of endless belts with coacting runs spaced apart to form between them a molding space with said coacting runs of the belt moving downwardly and return runs of said belt moving upwardly, and supplying at least most of the thermoplastic material to be molded in said mold space onto upwardly moving surfaces of both of said upwardly moving return runs.

2. A method as claimed in claim 1, and disposing said return runs in upwardly converging relationship at equal opposite angles to the vertical, between upper reversing wheels and lower reversing wheels that define the upper end lower limits of said runs, said material being applied to the return runs between said upper and lower wheels.

3. A method as claimed in claim 1, and supplying additional thermoplastic material at the top of said mold space between previously applied layers of said thermoplastic material on said belts.

4. A method as claimed in claim 3, in which said additional thermoplastic material is in the form of solid granules.

5. Apparatus for manufacturing sheets of thermoplastic material, comprising a pair of endless belts having opposed spaced coacting runs defining between them a vertical mold space, means for circulating said endless belts in a direction such that said coacting runs move downwardly, upper and lower reversing wheels defining return runs of said belts along which said belts move upwardly, said return runs converging upwardly at equal opposite angles to the vertical, and means to apply said thermoplastic material to said upwardly converging return runs of both said belts between said upper and lower wheels.

6. Apparatus as claimed in claim 5, and upper reversing wheels about which said belts move, said upper reversing wheels being spaced apart a distance exceeding twice the thickness of a belt and a layer of thermoplastic material present on said belt, means at the upper end of said mold space for supplying additional thermoplastic material to said mold space, and guide wheels below said upper reversing wheels for pressing said belts toward each other to form a single sheet of thermoplastic material.

7. Apparatus for manufacturing sheets of thermoplastic material, comprising a pair of endless belts having coacting opposed spaced vertical downwardly moving runs defining between them a mold space, upper reversing wheels about which said belts pass when moving toward said mold space, means for supplying material to said belts before said belts reach said mold space, scrapers for lifting thermoplastic material from the belts after the belts have traversed a portion of the periphery of the reversing wheels and before the belts have entered the mold space, and means below said scrapers for supplying additional thermoplastic material between the belts and the layers of thermoplastic material that have been lifted by the scrapers.

8. Apparatus as claimed in claim 7, and rolls between which said belts subsequently pass to press said belts toward each other thereby to form a single layer of thermoplastic material.

* * * * *